United States Patent [19]
Woodbridge et al.

[11] 3,738,318
[45] June 12, 1973

[54] ARTIFICIAL CLUTCH FOR GROWING OYSTERS

[75] Inventors: David D. Woodbridge; William R. Garrett, both of Melbourne, Fla.

[73] Assignee: National Shellfish Processors, Inc., Melbourne, Fla.

[22] Filed: Mar. 20, 1972

[21] Appl. No.: 236,470

[52] U.S. Cl. ................................................. 119/4
[51] Int. Cl. ........................................... A01k 61/00
[58] Field of Search ........................................ 119/4

[56] References Cited
UNITED STATES PATENTS

| | | |
|---|---|---|
| 3,556,052 | 1/1971 | Blount ................................. 119/4 |
| 3,294,061 | 12/1966 | Hanks ................................. 119/4 |
| 3,347,210 | 10/1967 | Golub ................................. 119/4 |
| 3,552,357 | 1/1971 | Quayle ................................. 119/4 |

*Primary Examiner*—Russell R. Kinsey
*Assistant Examiner*—J. A. Oliff
*Attorney*—Duckworth and Hobby

[57] ABSTRACT

An artificial clutch apparatus for growing oysters on is provided which has a concrete base for holding the clutch beneath the water in an upright position and has a center rod embedded in the concrete and extending vertically from the base and having a hook or eye for hooking to the artificial clutch for lifting it out of the water during harvesting. A plurality of elongated rods are either embedded in the concrete base or attached to the center frame member, and each having a plurality of metal cans connected thereto for growing oysters on which cans may be sprayed with gunite or concrete to provide an improved growing surface.

8 Claims, 2 Drawing Figures

PATENTED JUN 12 1973 3,738,318

ARTIFICIAL CLUTCH FOR GROWING OYSTERS

BACKGROUND OF THE INVENTION

The present invention relates to artificial clutch for growing oysters on.

In the past bivalves, such as oysters, have been grown by the spat of the oyster attaching itself to stones, old shells of oysters, and the like, and clinging thereto until the soft shell forms and the young oyster seeds are created. The underwater material to which the spat attaches is known as clutch, and if too freely exposed, such as when lying on the bottom, the oyster becomes vulnerable to attack by numerous underwater enemies such as starfish, crabs, drumfish, and the like, and may be sometimes smothered by shifting bottoms. When the bivalve, such as an oyster, increases in size, it has hinged beveled shells or valves which are opened and closed by the oyster which pumps or passes water through its system at varying rates while absorbing oxygen from the water and trapping food such as minute plankton, and the like. However, with the growth of population around coastal areas and the discharge of various waste, oysters are frequently rendered unmarketable because of the accumulation in the oyster of undesirable biological agents and it has been found desirable in order to reduce the pollution of the oysters to maintain the oysters above the bottom of the water source so that the water being pumped through the oyster's system will not pick up a great deal of minute trash along the bottom of the water source. It has also been a problem in the past to maintain a clutch on which the oysters can be rapidly harvested.

It is accordingly one advantage of the present invention to provide an oyster clutch which will maintain the oysters above the bottom of the natural water source for firmly anchoring the clutch to the bottom, yet providing means for lifting the clutch for harvesting.

It is another object of the present invention to provide an oyster clutch utilizing used waste hollow cans, especially aluminum cans for growing the oysters on, thereby providing a use for a waste product without having cans freely disposed around the bottom of the water source.

In the past there have been a number of proposals for improving clutch and accessibility to the oysters growing therefrom, some of which include suspended strings, or the like, carrying enlarged clutch members or areas. Such suspension of the clutch desirably maintains it in spaced relationship with respect to the bottom of the water, and therefore frequent attack by drills, starfish and other crawling enemies. Other artificial clutch would provide means for anchoring the clutch to the bottom of the water source by driving a post into the bottom of the water source and attaching the artificial clutch to the post. One such system can be seen in U. S. Pat. No. 3,455,278. Another prior art artificial oyster clutch can be seen in U. S. Pat No. 3,316,881, which has a plurality of shaped surfaces attached to each other for operation between an anchor and a float and one U. S. Pat. No. 3,294,061, which has a plurality of cylindrical housings with smooth outer surfaces extending substantially horizontally for growing oysters on. U.S. Pat. No. 3,347,210 would combine a plurality of tire heads for growing oysters on, while U.S. Pat. No. 2,319,170 would combine a plurality of flat members having straight edges and attached to a cord between anchors or between an anchor and a float; and U.S. Pat. No. 1,815,521 would provide a plurality of flexible ropes attached to a frame held by a float. In contrast to these prior art systems, the present invention is directed towards a simple, economically manufactured artificial oyster clutch utilizing a weighted concrete base having a frame attached thereto and utilizing waste products such as used cans for growing the oysters on.

SUMMARY OF THE INVENTION

The present invention relates to an oyster clutch and especially to an apparatus for growing and harvesting oysters on. It has a concrete base for holding the clutch in position and anchoring to the bottom of the water source. A plurality of rod-like members are attached to the base by having at least one of the rods imbedded in the concrete base. Hollow cans are mounted on the rod-like members for growing oysters on and the cans may be coated so as to facilitate the growth of the oysters. They can be coated with concrete or gunite, as desired. At least one of the rod-like members which may be larger than the remaining rod-like members, is adapted to provide a catch-point for lifting the artificial clutch during harvesting. The cans may be held by being stacked against each other on the rods, or may be glued, if desired, and the individual rods may all be anchored to the concrete base or alternatively can be welded to a central rod which acts as the main support and lifting portion for the apparatus. Thus one end of the main rod is embedded in the concrete which end may have horizontal reinforcing members extending therefrom, and the other end of the main rod has a hook or eye attaching point.

BRIEF DESCRIPTION OF THE DRAWINGS

Other objects, features and advamtages of the present invention will be apparent from a study of the written description and the drawings, in which.

DESCRIPTION OF THE PREFERRED EMBODIMENTS

Figure 1:
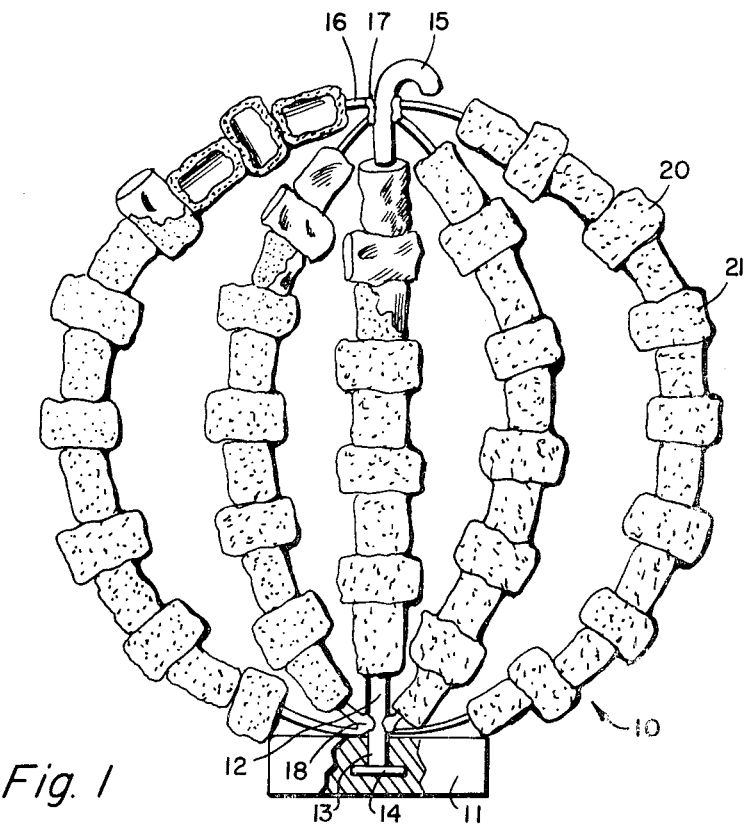
FIG. 1 shows a sectional view of one embodiment of the present invention.

Referring now to FIG. 1, an apparatus is for growing oysters, has a concrete base member 11, with a central or main support rod 12 embedded therein at 13 with horizontal reinforcing plate 14 for increasing the strength between the rod 12 and concrete base 11 for lifting the heavy base 11. The rod 12 has a hook 15 at its opposite end which is suitable for engagement with another hook or cable for lifting the apparatus 10 during the harvesting of the oysters. Base 11 is sufficiently large to provide the necessary anchoring weight for holding the apparatus 10 to the bottom of a water source in an upright position. A plurality of rods 16 are welded at 17 and at 18 to the main central rod 12, and each rod 16 has a plurality of cans 20 attached thereto which may abut each other and may be alternated vertically or horizontally as shown. The cans themselves do not have to be anchored other than pushed onto the rod 16 but may, if desired, be glued or otherwise held more firmly together and to the rod 16. The cans 20 have a coated surface 21 which is a spray-on concrete or gunite coating which provides a better surface for the growing of oysters on, and also helps anchor the cans together. This surface is also easily applied by commercial gunite spraying equipment. However, it should be clear that the cans 20 can be utilized without additional coating if desired, in which case used aluminum cans are preferred because of the less rapid corrosion of the aluminum. The rods 16 and 12 can be made of any material desired, but would desirably be made of steel which is coated or aluminum, which would not have to be coated. Inasmuch as standard rods or pipes can be utilized for the rods 12 and 16, and can be rapidly imbedded in a concrete mold 11 and utilized with used cans 20, an inexpensive artificial clutch is provided utilizing what would otherwise be a waste product.

Figure 2:
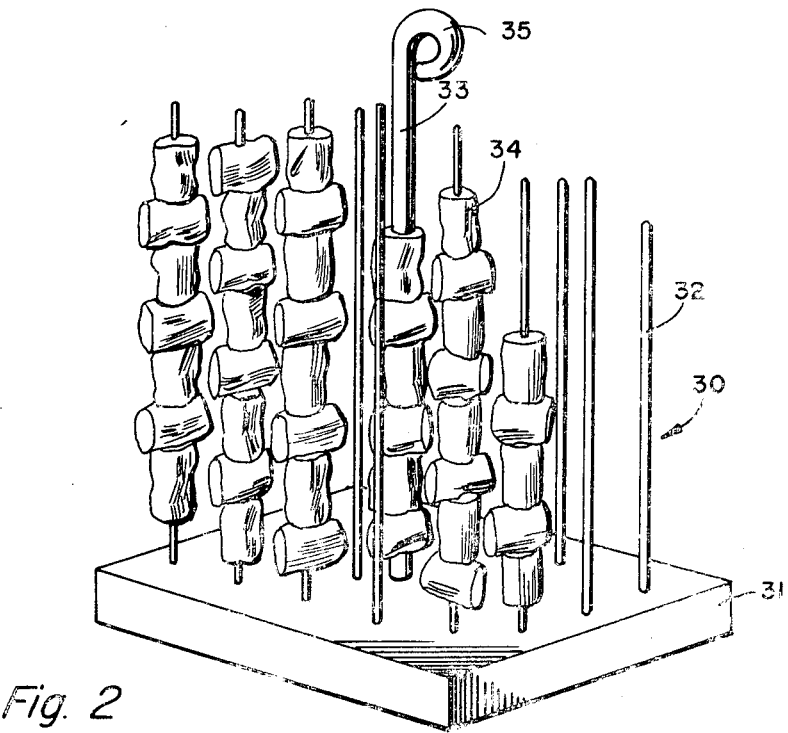
FIG. 2 shows a perspective view of a second embodiment of the present invention.

Referring now to FIG. 2, a second embodiment 30 of the artificial clutch according to the present invention is illustrated having a concrete base 31 and a plurality of rods 32 embedded in the base 31, with a central rod 33 also embedded in the concrete base 31. The rods are shown extending vertically from the base 31 and not attached to the other end even though it should be clear that the opposite ends of the rods 32 from the base 31 could be attached to each other or onto the central member 33 without departing from the spirit and scope of the invention. In this embodiment, if the rods 32 are left freestanding, the end can of the plurality of metal cans 34 would have to be fixedly attached to the rod to maintain the other cans on the rod. The cans 34 are also shown attached to the main support rod 33, and these may be added or left off depending upon the ease of manufacture of the apparatus. The main central rod 33 in this embodiment has an eye 35 for lifting the apparatus rather than the hook 15 of FIG. 1. In either case the lifting hook, cable, loop or any desired connection from a cable or rope or cord can be utilized to connect to the hook or eye for lifting the apparatus during harvesting. If desired the cables could be attached and connected to a float for ready lifting when harvesting. The cans 34, in this embodiment, are shown without having the coating of concrete 21 in FIG. 1, but it should of course be clear that they can be coated in the same manner, if desired.

It should be clear aa this point that an apparatus including an artificial clutch for growing oysters on has been provided, which can be made from inexpensive materials and utilizing waste cans, but it should also be clear that this invention is not to be construed as limited to the particular forms disclosed herein since these are to be regarded as illustrative rather than restrictive.

I claim:

1. An apparatus for growing oysters comprising in combination: a concrete base for anchoring said apparatus to a submerged surface in an upright position; a plurality of elongated rod-like members fixedly attached to said base; and at least one rod-like member being fixedly attached to said concrete base at one end and having a lifting portion at the opposite end thereof for engaging and lifting said concrete base from a submerged surface; and a plurality of metal cans attached to said rod-like members for growing oysters on, whereby said base will anchor said apparatus to a submerged surface and hold said rods and metal cans in an upright position above the submerged surface while providing a lifting means therefor and an artificial clutch for growing oysters on, said plurality of cans being covered with a concrete material to provide a surface which facilitates the growing of oysters thereon.

2. The apparatus according to claim 1 in which said rod-like member having a lifting portion has a reinforcing portion in said concrete base.

3. The apparatus in accordance with claim 2 in which each rod-like member has one end embedded in said concrete base.

4. The apparatus in accordance with claim 2 in which said one rod-like member having a lifting portion has one end embedded in said concrete base and the remaining rod-like members are attached to said one rod-like member.

5. The apparatus according to claim 4 in which said remaining rod-like members have both ends attached to said one rod-like member.

6. The apparatus in accordance with claim 4 in which said lifting portion of said one rod-like member has its other end portion hook-shaped.

7. The apparatus in accordance with claim 4 in which said lifting portion of said one rod-like member has its other end portion eye-shaped.

8. The apparatus according to claim 3 in which one said metal can on each said rod-like member is fixedly attached to said rod-like member for holding the remaining metal cans on said rod-like members.

* * * * *